United States Patent [19]
Umeki et al.

[11] 3,958,068
[45] May 18, 1976

[54] PROCESS FOR THE PRODUCTION OF POWDERED MAGNETIC MATERIAL

[75] Inventors: Shinji Umeki, Tokyo; Fujio Shibata, Yachiyo, both of Japan

[73] Assignee: TDK Electronics Company, Limited, Tokyo, Japan

[22] Filed: May 30, 1972

[21] Appl. No.: 257,716

[30] Foreign Application Priority Data
May 27, 1971  Japan.............................. 46-35860

[52] U.S. Cl................................ 428/403; 427/128; 427/132; 428/900
[51] Int. Cl.² ........................................... H01F 1/06
[58] Field of Search.... 117/100 B, 100 M, 234–240; 252/62.54; 428/403, 900; 427/128, 132

[56] References Cited
UNITED STATES PATENTS

| | | | |
|---|---|---|---|
| 2,809,731 | 10/1957 | Rau.............................. | 117/234 X |
| 3,139,354 | 6/1964 | Wolff............................ | 117/234 X |
| 3,556,839 | 1/1971 | Roy.............................. | 117/100 |
| 3,632,512 | 1/1972 | Miller........................... | 117/100 X |
| 3,718,594 | 2/1973 | Miller........................... | 117/234 X |

Primary Examiner—Bernard D. Pianalto
Attorney, Agent, or Firm—Staas & Halsey

[57] ABSTRACT

A process is disclosed for the production of powdered magnetic material for use in magnetic recording materials. The process comprises the steps of dispersing finely divided particles of a ferromagnetic oxide into an aqueous solution, dissolving therein salts of one or more ferromagnetic metals and a water soluble reducing agent, and then heating the dispersion while stirring to form and deposit a coating of the ferromagnetic metal (or alloy) on the surface of the finely divided particles of ferromagnetic oxide.

9 Claims, No Drawings

PROCESS FOR THE PRODUCTION OF POWDERED MAGNETIC MATERIAL

BACKGROUND OF THE INVENTION

1. Field of the Invention

This invention relates to a process for the production of powdered magnetic material for use in magnetic recording media.

2. Description of the Prior Art

With the increasing advancement made in magnetic recording techniques, $\gamma.Fe_2O_3$ chiefly used heretofore can no longer meet all the requisite magnetic properties. Further, the necessity for using magnetic materials with higher coercive force and higher magnetic flux density is growing. Although an Fe-Ni-Co alloy powder has been known, over about one decade, to be one of the magnetic materials meeting such magnetic properties, its use for magnetic recording has not yet been put into practice due to difficulties and costs involved in its production.

SUMMARY OF THE INVENTION

Therefore, it is an object of this invention to provide a process for the production of magnetic materials having a high coercive force and a high magnetic flux capable of being produced on a large scale, at only a slightly higher cost than in the production of conventional $\gamma.Fe_2O_3$ magnetic powder, without accompanying any technical difficulties of the prior art.

Thus, the process of this invention comprises depositing an alloy film composed predominantly of cobalt and having a high coercive force and a high magnetic flux, onto the surface of magnetic materials conventionally employed, e.g. acicular $\gamma.Fe_2O_3$ or acicular $Fe_3O_4$, to provide as a whole a magnetic material having a high coercive force and a high magnetic flux density. More particularly, the process of the invention may be practiced in one illustrative embodiment by dispersing finely divided particles of a ferromagnetic oxide into an aqueous solution containing an ion of such metals as cobalt and nickel and a reducing agent capable of reducing the metal ion in an aqueous medium, e.g. hydrazine and a derivative thereof, sodium hypophosphite and hydrosulfite; and then reacting the ion with the reducing agent under such conditions as to cause the reductive reaction. By this reductive reaction, a coating of a ferromagnetic metal such as cobalt or that of a ferromagnetic alloy such as cobalt-nickel alloy can be formed and deposited on the surface of finely divided particles of a ferromagnetic oxide.

DESCRIPTION OF THE PREFERRED EMBODIMENTS

This invention will be described in more detail by way of the following non-limitative examples.

EXAMPLE 1

About 50 g. of acicular magnetite having a longitudinal axis of about $0.5\mu$ and an acicular ratio of 6/8, were dispersed into a reaction solution of the composition shown below, having a pH of 8.2-8.6 and the dispersion was heated for about 1 hour to effect the reaction at 105°C.

| Composition of the reaction solution | |
| --- | --- |
| Cobalt chloride | 10 g. |
| Sodium citrate | 20 |
| Sodium hypophosphite | 5 |
| Ammonium Chloride | 10 |
| 23% ammoniac water | 10 |
| Water | 1000 |

The reaction product was washed with water, dried and then measured for its magnetic properties whereby the resultant product has a higher coercive force and a higher magnetic flux density than those exhibited by the magnetite beofre the reaction. The data obtained are shown below.

| | Magnetite before the reaction | Reaction product |
| --- | --- | --- |
| Coercive force, oersted | 390 | 510 |
| Remanent magnetic flux density, $Gcm^3/g$ | 485 | 505 |
| Saturated magnetic flux density, $Gcm^3/g$ | 970 | 1000 |
| Squareness | 0.50 | 0.505 |

EXAMPLE 2

About 40 g. of acicular magnetite having a longitudinal axis of about $0.5\mu$ and an acicular ratio of 6/8 are dispersed into a reaction solution of the composition shown below, having a pH of 12.0-14 12.4 and the reaction is carried out at a temperature of 70°±2°C. for 3 hours.

| Composition of the reaction solution | |
| --- | --- |
| Cobalt chloride | 20 g. |
| Sodium tartrate | 100 |
| Hydrazine hydrochloride | 100 |
| Sodium hydroxide | 85 |
| Water | 1000 |

The reaction product is washed with water, dried and then measured for its magnetic properties whereby the resultant product has a higher coercive force and a greater magnetic flux density than the magnetite before the reaction.

The data obtained are shown below.

| | Magnetite before the reaction | Reaction product |
| --- | --- | --- |
| Coercive force, oersted | 390 | 470 |
| Remanent magnetic flux density, $Gcm^3/g$ | 435 | 520 |
| Saturated magnetic flux density, $Gcm^3/g$ | 970 | 1105 |
| Squareness | 0.50 | 0.47 |

Although these above given Examples illustrate the process wherein cobalt is deposited on the acicular magnetite surface, there can be used in addition to acicular magnetite, any of the finely divided ferromagnetic oxides such as acicular $\gamma.Fe_2O_3$, iron oxide in plate form, acicular chromium dioxide and granular cobalt-ferrite, regardless of their configuration and quality. As the metal to be deposited on such core oxides, there may be used, besides cobalt, in these Examples, nickel, iron and alloys thereof, as well as any of ferromagnetic alloys containing such metals as manganese, copper and zinc. As the reducing agent, there may be used, in addition to sodium hypophosphite and hydrosulfite used in the above-given Examples, hydrazine hydrate, a hydrosulfite, sodium borohydride, formalin and the like.

It will be appreciated that the reaction conditons, e.g. pH, reaction temperature and reaction time, specified in these Examples be not applied to all of the cases and that the optimal reaction conditions have to be determined by taking into account the type and concentration of the reducing agent, the type of metal to be deposited and the amount of metal deposited as well as the magnetic properties desired in the resulting powdered magnetic material.

As is apparent from the foregoing, this invention is of great industrial value since it provides a simple and effective process for producing a powdered magnetic material suitable, because of its high coercive force and high magnetic flux density, for use in a material for high density magnetic recording. Furthermore, the manufacturing plant can be fabricated at a relatively low cost and the magnitude of lot can also be determined according to demand, thus minimizing fluctuation in quality of the product.

Numerous changes may be made in the above-described apparatus and the different embodiments of the invention may be made without departing from the spirit thereof; therefore, it is intended that all matter contained in the foregoing description shall be interpreted as illustrative and not in a limiting sense.

What is claimed is:

1. A process for making magnetic powder adapted for use as a magnetic recording medium which comprises:
    providing a dispersion of finely divided particles consisting essentially of solid ferromagnetic oxide in an aqueous solution of ferromagnetic metal salt;
    reacting the ferromagnetic salt with a water soluble reducing agent during agitation to precipitate the ferromagnetic metal and form a free metal coating on the particles; and
    recovering coated particles having enhanced coercive force and magnetic flux.

2. The process of claim 1, wherein the aqueous solution is heated to deposit a coating of a ferromagnetic alloy on the surface of said finely divided particles of ferromagnetic oxide.

3. The process of claim 1, wherein said ferromagnetic oxide is selected from a group comprised of $\gamma.Fe_2O_3$, $Fe_3O_4$, chromium dioxide, and cobalt-ferrite.

4. The process of claim 1 wherein at least one ferromagnetic metal is selected from the group consisting of cobalt, nickel, iron and alloys thereof.

5. A process of claim 4, wherein said alloys comprise at least one metal selected from the group consisting of manganese, copper and zinc.

6. The process of claim 1, wherein said reducing agent is selected from the group consisting of sodium hypophosphite, sodium hydrosulfite, hydrazine hydrate, sodium borohydride and formalin.

7. The process as claimed in claim 1, wherein said ferromagnetic oxide has a longitudinal axis of about $0.5\mu$ and an acicular ratio in the range of 6–8.

8. A magnetic powder made by the process of claim 1.

9. A process for making magnetic powder which comprises:
    dispersing finely divided ferromagnetic oxide particles in an aqueous treating medium containing at least one salt of a ferromagnetic metal; and
    precipitating ferromagnetic metal onto the particles from the aqueous medium under agitation to deposit a coating of the ferromagnetic metal on the particles;
    thereby providing coated particles having enhanced coercive force and magnetic flux.

* * * * *

UNITED STATES PATENT AND TRADEMARK OFFICE
CERTIFICATE OF CORRECTION

PATENT NO. : 3,958,068
DATED : May 18, 1976
INVENTOR(S) : Shinji Umeki et al

It is certified that error appears in the above-identified patent and that said Letters Patent are hereby corrected as shown below:

Column 1, line 64, change "6/8" to --6-8--.

Column 2, in the chart before "EXAMPLE 2", after "Squareness" insert --ratio--.

Column 2, line 31, change "6/8" to --6-8--.

Column 2, line 33, change "12.0-14 12.4" to --12.0-12.4--.

Column 2, in the chart after line 50, after "Squareness" insert --ratio--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*